United States Patent
Umezawa et al.

(10) Patent No.: US 11,242,022 B2
(45) Date of Patent: Feb. 8, 2022

(54) PEDESTRIAN PROTECTING DEVICE FOR VEHICLE AND VEHICLE INCLUDING SAME

(71) Applicant: HONDA MOTOR CO., LTD., Tokyo (JP)

(72) Inventors: Masaki Umezawa, Wako (JP); Hiroyuki Asanuma, Wako (JP); Yasuaki Gunji, Wako (JP); Osamu Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 68 days.

(21) Appl. No.: 16/544,024

(22) Filed: Aug. 19, 2019

(65) Prior Publication Data
US 2020/0062202 A1    Feb. 27, 2020

(30) Foreign Application Priority Data

Aug. 21, 2018    (JP) .............................. JP2018-154455

(51) Int. Cl.
| | |
|---|---|
| *B60R 21/0132* | (2006.01) |
| *B60R 21/36* | (2011.01) |
| *B60R 21/0136* | (2006.01) |
| *B60R 21/38* | (2011.01) |
| *B60R 21/01* | (2006.01) |

(52) U.S. Cl.
CPC ...... *B60R 21/0132* (2013.01); *B60R 21/0136* (2013.01); *B60R 21/36* (2013.01); *B60R 21/38* (2013.01); *B60R 2021/01034* (2013.01); *B60R 2021/01225* (2013.01)

(58) Field of Classification Search
None
See application file for complete search history.

(56) References Cited

U.S. PATENT DOCUMENTS

| | | | | |
|---|---|---|---|---|
| 7,543,677 | B2 * | 6/2009 | Igawa ................. | B60R 21/0134 180/274 |
| 8,798,867 | B2 * | 8/2014 | Stoll ...................... | B60R 21/01 701/45 |
| 9,457,762 | B2 * | 10/2016 | Jayasuriya .............. | B60R 21/36 |

(Continued)

FOREIGN PATENT DOCUMENTS

| | | |
|---|---|---|
| JP | H07-246908 A | 9/1995 |
| JP | 2003-226211 A | 8/2003 |
| JP | 2006-044325 A | 2/2006 |

(Continued)

OTHER PUBLICATIONS

Office Action received in corresponding CN application No. 201910769302.8 dated Jul. 28, 2021 with English translation (17 pages).

(Continued)

*Primary Examiner* — Faye M Fleming
(74) *Attorney, Agent, or Firm* — Rankin, Hill & Clark LLP

(57) ABSTRACT

A pedestrian protecting device for vehicle comprises: a protection device which protects a protection target upon colliding with a vehicle; a measurement device which measures an image of the protection target and a distance from the vehicle to the protection target; and a control device which operates the protection device in a different manner depending on a size of the protection target.

10 Claims, 10 Drawing Sheets

(56) References Cited

U.S. PATENT DOCUMENTS 10,308,212 B2 * 6/2019 Wu .................. B60R 19/205

FOREIGN PATENT DOCUMENTS

| | | |
|---|---|---|
| JP | 2007-269169 A | 10/2007 |
| JP | 4161933 B2 | 10/2008 |
| JP | 4349041 B2 | 10/2009 |
| WO | 2017056381 A1 | 4/2017 |

OTHER PUBLICATIONS

Office Action received in corresponding Japanese application No. 2018-154455 dated Nov. 2, 2021 with English translation (7 pages).

* cited by examiner

PEDESTRIAN PROTECTING DEVICE FOR VEHICLE AND VEHICLE INCLUDING SAME

BACKGROUND OF THE INVENTION

1. Field of the Invention

The present invention relates to a pedestrian protecting device for vehicle designed for protection depending on a protection target when the vehicle collides with a protection target such as a pedestrian, and to a vehicle provided with the same.

2. Description of the Related Art

Known conventional vehicle-mounted protection systems which deploy an airbag to reduce the impact on a protection target (pedestrian) at the time of collision between the vehicle and the protection target are, for example, vehicle-mounted pedestrian protection systems described in Japanese Patent Application Publication No. 2006-044325 (Patent Document 1) and International Publication No. WO2017/056381 (Patent Document 2).

The vehicle-mounted pedestrian protection system described in Patent Document 1 deploys an airbag, provided with a slide-up preventing means, upward from the front bumper at the time of collision and thereby prevents a pedestrian from sliding up rearward above the vehicle.

The damage reduction system described in Patent Document 2 absorbs the impact on a pedestrian with a hood (bonnet) and an airbag deployed on a windshield, and then prevents the pedestrian from falling down by detecting the movement of the pedestrian on the hood with a camera and performing acceleration or deceleration and steering.

SUMMARY OF THE INVENTION

It is to be noted that the vehicle-mounted protection systems described in Patent Documents 1 and 2 can absorb the impact on a protection target (pedestrian) with the airbag or the hood at the time of collision. However, when protecting the protection target with the airbag or the hood, the vehicle-mounted protection system operates the hood or the airbag without taking into consideration a difference in the protection target.

The present invention has been made in view of the above circumstances, and aims to provide a pedestrian protecting device for vehicle capable of protection depending on a protection target such as a pedestrian when the protection target collides with the vehicle, and a vehicle provided with the same.

For the purpose of solving the above problem, a pedestrian protecting device for vehicle according to a first aspect of the present invention comprises: a protection device which protects a protection target upon colliding with a vehicle; a measurement device which measures an image of the protection target and a distance from the vehicle to the protection target; and a control device which operates the protection device in a different manner depending on a size of the protection target.

A vehicle according to a second aspect of the present invention is a vehicle comprising the pedestrian protecting device for vehicle according to the first aspect of the present invention.

The present invention makes it possible to achieve a pedestrian protecting device for vehicle capable of protection depending on the protection target when the protection target such as a pedestrian collides with the vehicle, and a vehicle provided with the same.

DETAILED DESCRIPTION OF THE EMBODIMENTS

Hereinafter, embodiments of the present invention are described in detail with reference to the drawings.

A pedestrian protecting device for vehicle according to the present invention is a device which protects a pedestrian, a bicycle, or the like that has collided with a vehicle.

Figure 1:
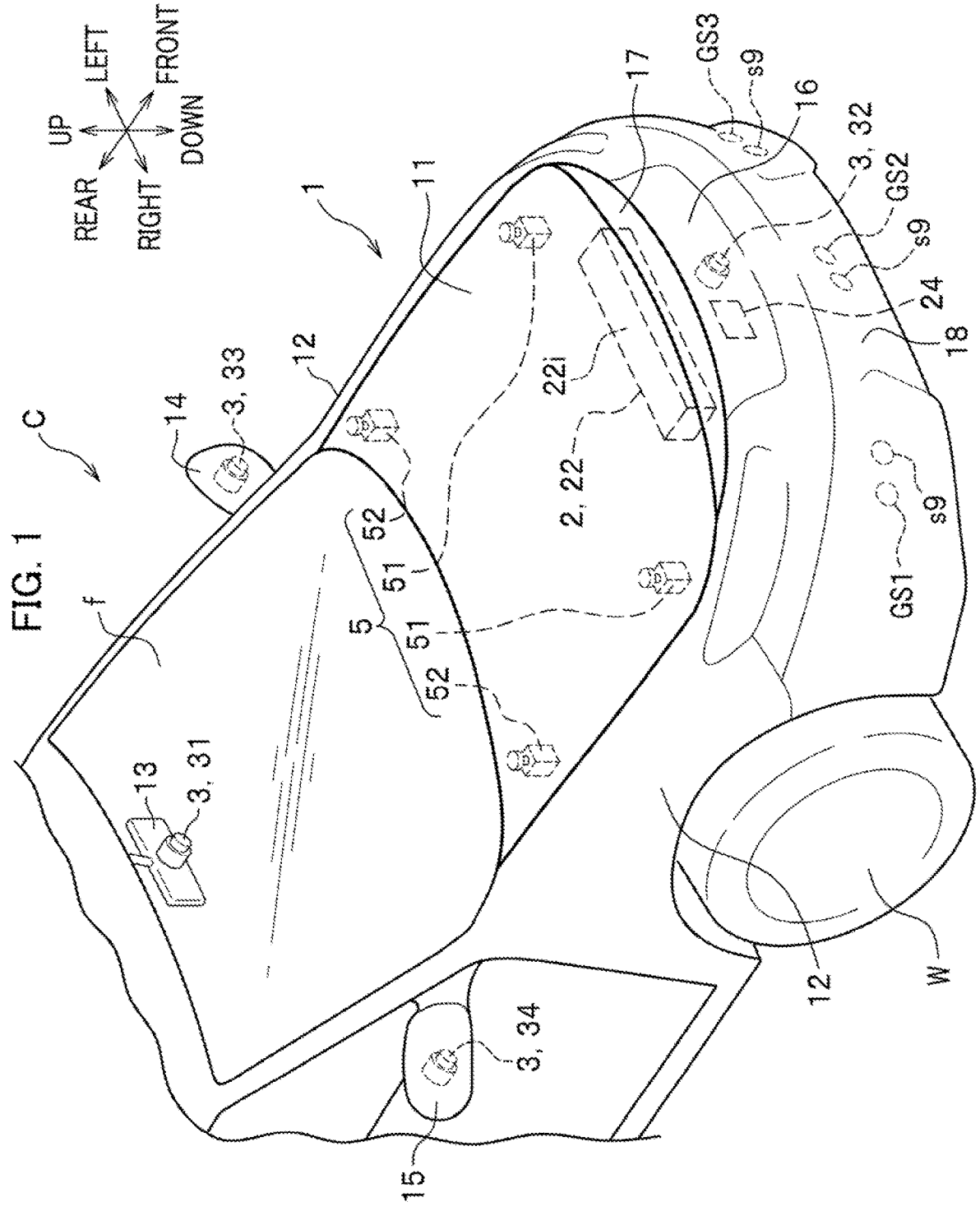
FIG. 1 is a schematic perspective view of a main part illustrating an example of a pedestrian protecting device for vehicle according to an embodiment of the present invention.

FIG. 1 is a schematic perspective view of a main part illustrating an example of a pedestrian protecting device 1 for vehicle according to an embodiment of the present invention, and illustrates the state of the front part of the vehicle at normal time.

Note that the traveling direction of the vehicle C is defined as "front," the backward direction as "rear," the vertical upper direction as "up," the vertical lower direction as "down," and the vehicle width direction as "left" and "right" when viewed from the viewpoint of the vehicle C.

Description is provided for the vehicle C to be mounted with the pedestrian protecting device 1 for vehicle.
<Vehicle C>

As illustrated in FIG. 1, it suffices that the vehicle C to be mounted with the pedestrian protecting device 1 for vehicle of the present invention is a bonnet type automobile provided with a hood 11 on the front side of the vehicle body, and the vehicle C may be of any vehicle type including passenger automobile and working vehicle. Hereinafter, as an example of the vehicle C, a passenger automobile having an engine room in the front part of the vehicle is described as an example.

A target to be protected by the pedestrian protecting device 1 for vehicle according to the embodiment is a pedestrian P, a bicycle, or the like, but in the present example, the pedestrian P is exemplified and described.

The vehicle C includes, for example, a hood 11, fenders 12, a rearview mirror 13, door mirrors 14 and 15, a hood grill 16, a hood edge cover 17, and a front bumper 18.

The hood 11 is raised by pop-up devices 5 when a collision target (protection target) to collide with the vehicle C collides. Thereby, when the protection target collides with the hood 11, the collision load is absorbed by increasing the amount of deformation of the hood 11, and the impact received by the protection target is buffered.

The hood 11 includes, for example, a hood skin installed on the upper side of the engine room, and a hood frame fixed inside the engine room of the hood skin. The hood skin is formed of a plate material having softness and elasticity which is curved and deformed when pressed with a predetermined load or heavier so that the pedestrian P can be softly received when the pedestrian P falls on the hood skin at the time of collision.

The fenders 12 are fender panels provided on the left and right of the hood 11 and provided above the front wheels.

The rearview mirror 13 is a rearview mirror provided at the upper front end of the vehicle interior.

The door mirrors 14 and 15 are mirrors provided at the front left and right upper ends of the doors.

The food grill 16 is a member which takes in outside air from the front end portion of the vehicle and guides outside air to a radiator (illustration omitted). The food grill 16 has a plurality of substantially plate-shaped air guide plates provided in a manner extending in the vehicle width direction and arranged in parallel in the up-down direction with appropriate intervals. Behind the food grill 16, a camera 32 is disposed with a space in between.

The hood edge cover 17 is provided between the hood 11 and the hood grill 16. The hood edge cover 17 is a panel member which is pushed up and released by the deployment of a front airbag 21 disposed below the hood edge cover 17. The hood edge cover 17 is formed of a steel plate or the like provided in a manner extending in the vehicle width direction along the front end portion of the hood 11.

Figure 2A:
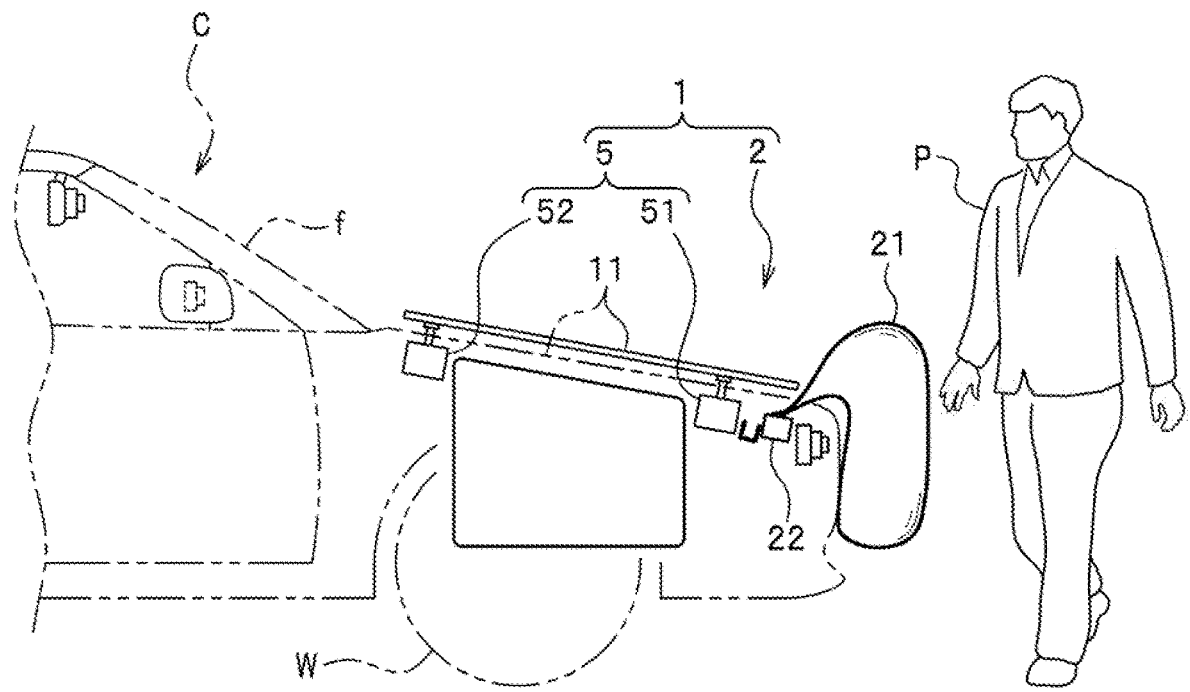
FIG. 2A is a view illustrating an operating state of the airbag device.

For example, as illustrated in FIG. 2A, the hood edge cover 17 is rotatably supported so that, when the front airbag 21 is deployed, the hood edge cover 17 is pushed up and rotated by the front airbag 21 to release the front airbag 21. Note that the mechanism for releasing the hood edge cover 17 may be changed as appropriate.

The front bumper 18 illustrated in FIG. 1 is a plate material disposed at the front end edge of the vehicle C, and is deformed at the time of collision to protect the vehicle C.

<Pedestrian Protecting Device 1 for Vehicle>

Figure 2B:
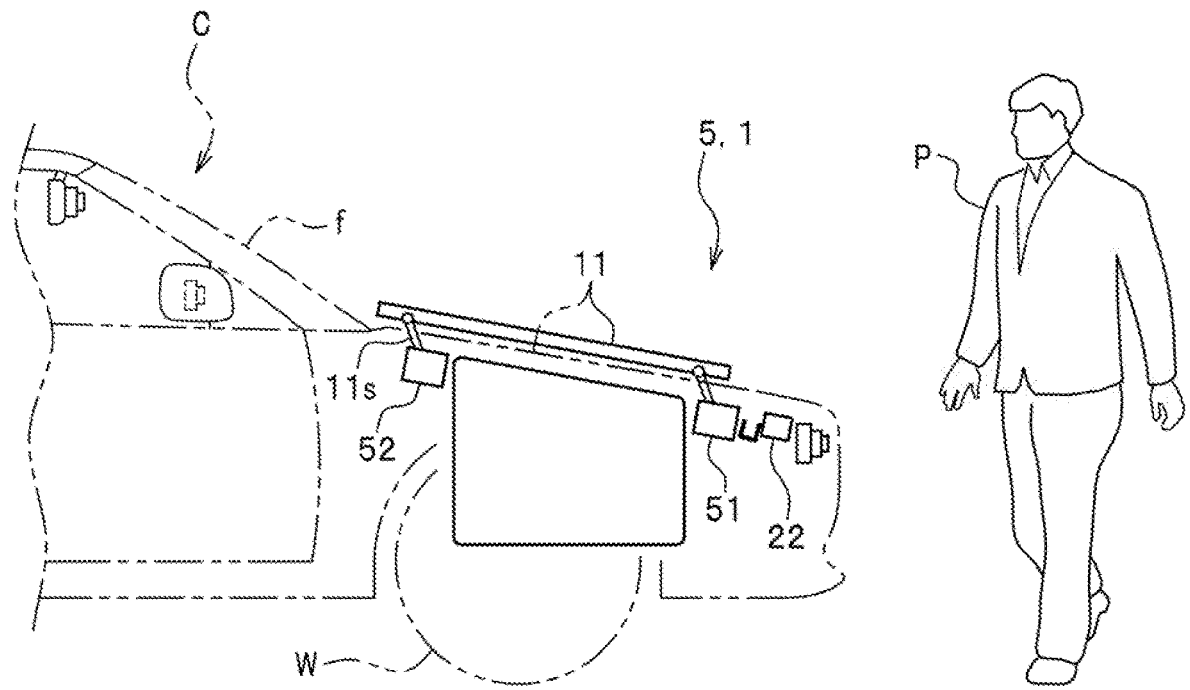
FIG. 2B is a view illustrating an operating state of pop-up devices.

FIG. 2A is a view illustrating an operating state of the airbag device 2, and FIG. 2B is a view illustrating an operating state of pop-up devices 5.

The pedestrian protecting device 1 for vehicle is a protection device for protection depending on the size of the protection target when the protection target such as the pedestrian P collides with the vehicle C.

The pedestrian protecting device 1 for vehicle includes an airbag device 2 (FIG. 2A) and pop-up devices 5 (FIG. 2B).

Figure 7A:
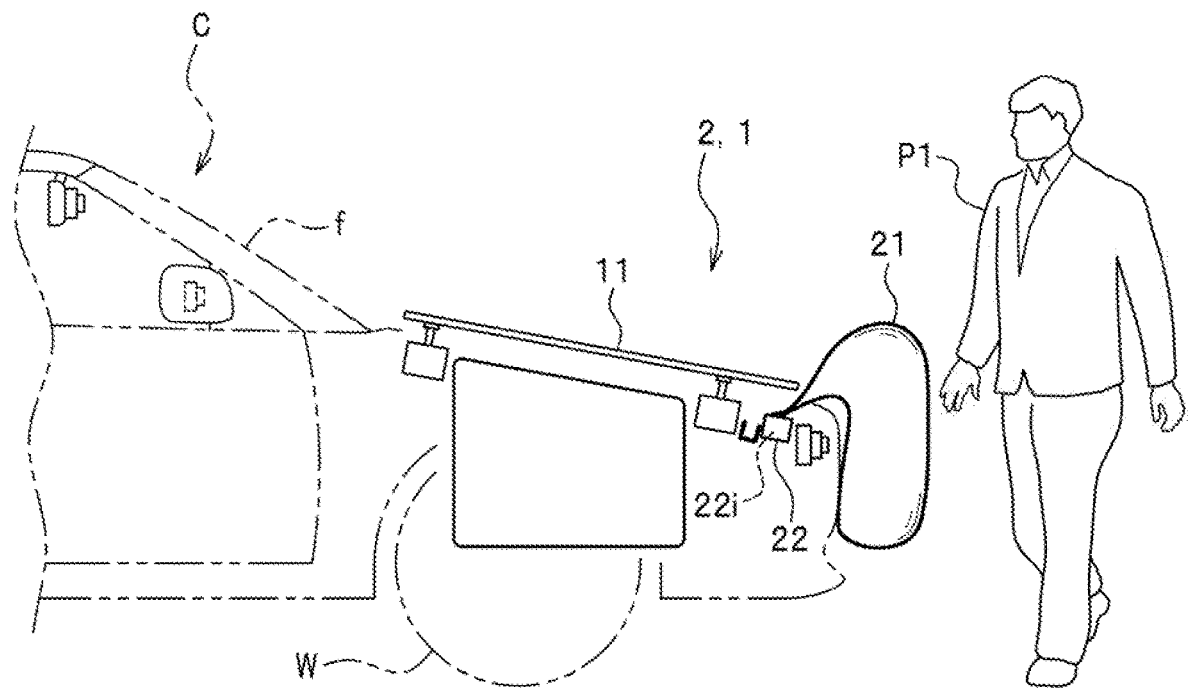
FIG. 7A is a view illustrating the operation of the airbag device for an adult pedestrian.
Figure 7B:
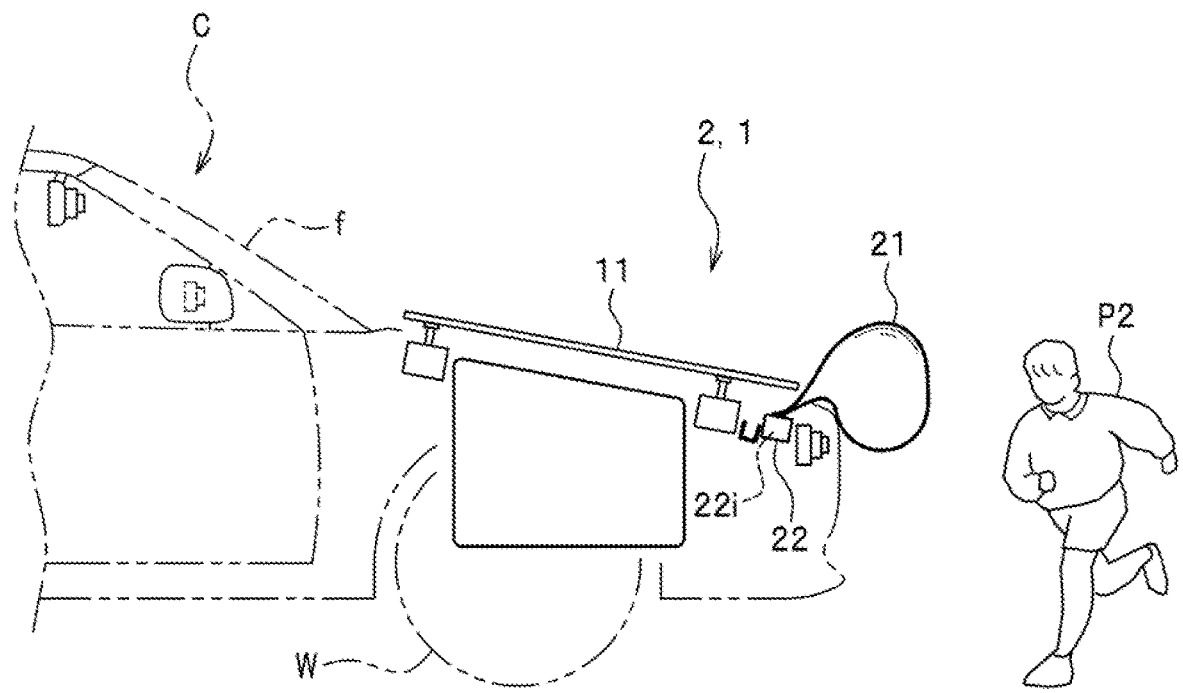
FIG. 7B is a view illustrating the operation of the airbag device for a child pedestrian.

The airbag device 2 protects the pedestrian P as the protection target by changing the size of the front airbag 21 depending on the size of the pedestrian P (FIGS. 7A and 7B).

Figure 9A:
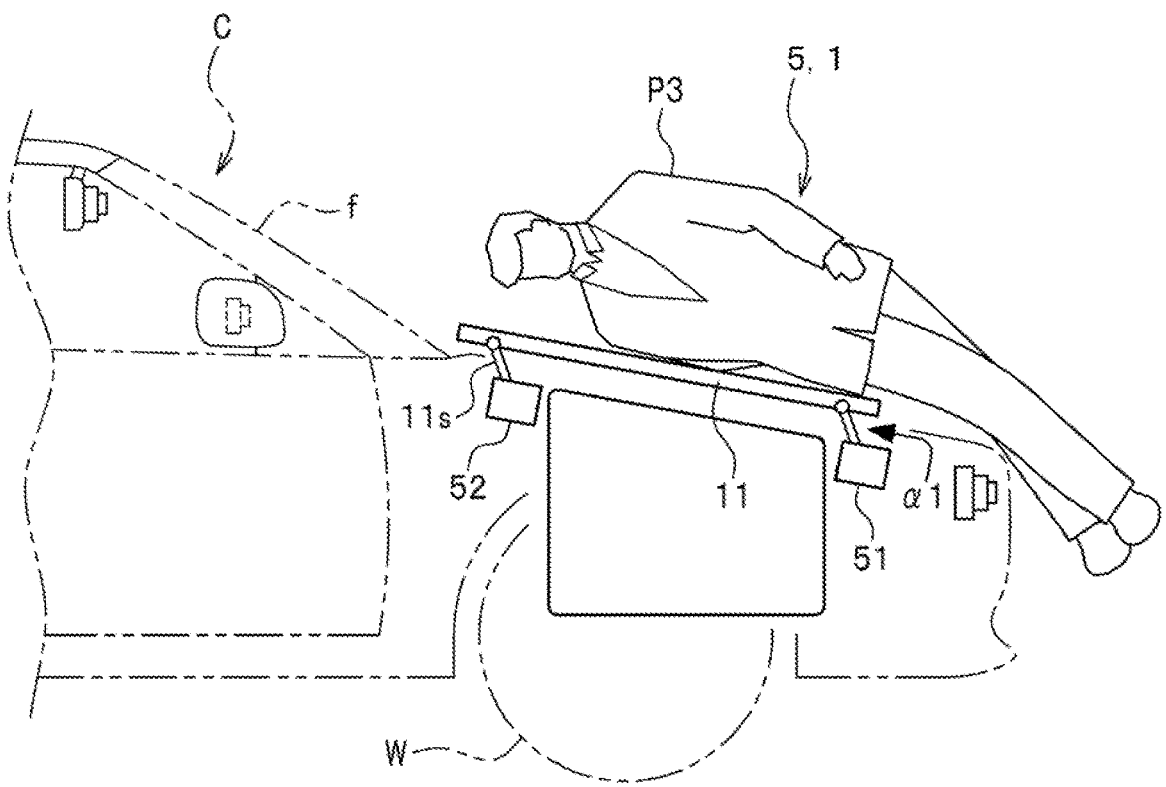
FIG. 9A is a view illustrating the operation of the pop-up devices for a large adult pedestrian.
Figure 9B:
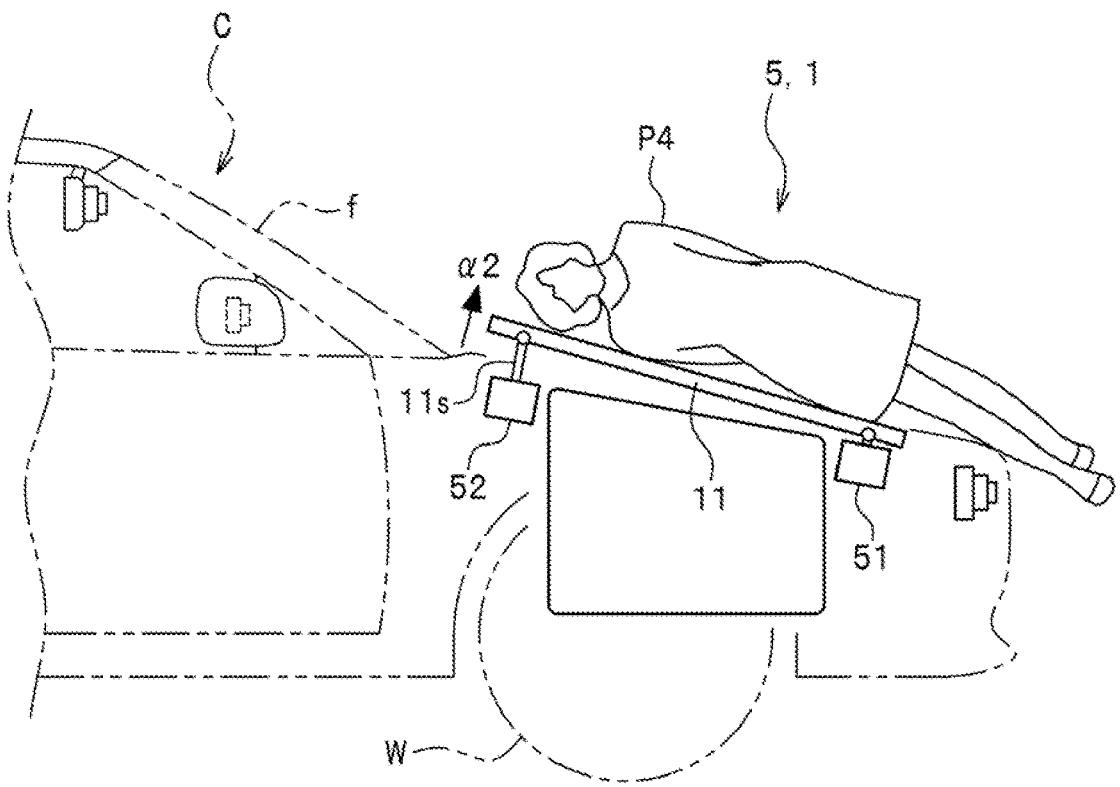
FIG. 9B is a view illustrating the operation of the pop-up devices for a small adult pedestrian.

The pop-up devices 5 protect the pedestrian P as the protection target by changing the manner of lifting the hood 11 depending on the size of the pedestrian P (FIGS. 9A and 9B).

Figure 3:
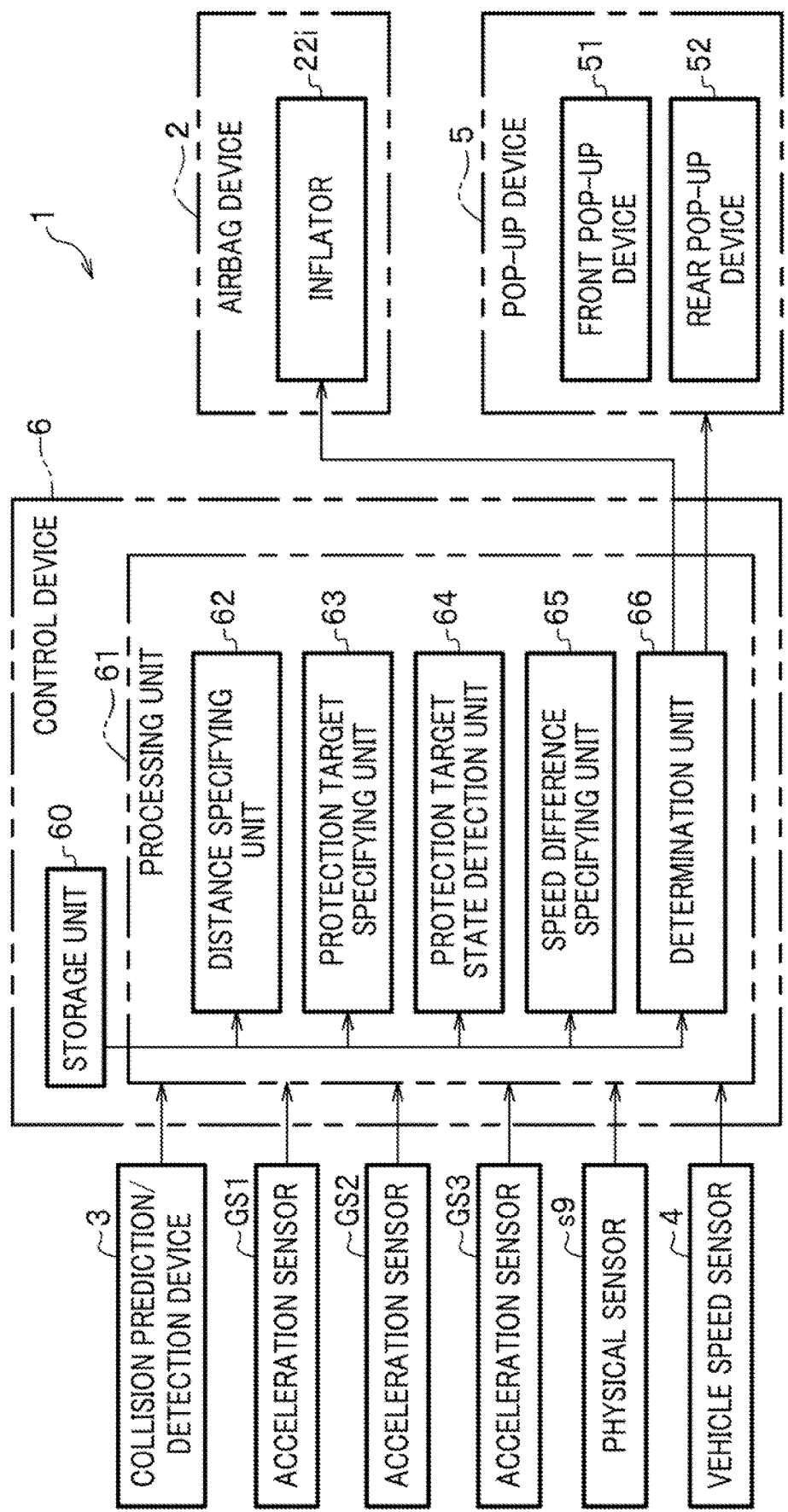
FIG. 3 is a control block diagram of the pedestrian protecting device for vehicle.

FIG. 3 is a control block diagram of the pedestrian protecting device 1 for vehicle.

The pedestrian protecting device 1 for vehicle includes a collision prediction/detection device 3, an airbag device 2, a vehicle speed sensor 4, acceleration sensors GS1, GS2, and GS3, a physical sensor s9 such as a P (pressure) sensor, pop-up devices 5, and a control device 6.

A determination unit 66 determines the size of the pedestrian P as the protection target upon collision, for example, a large adult, a child, or the like, and determines whether to operate the airbag device 2 and the pop-up devices 5.

<Vehicle Speed Sensor>

The vehicle speed sensor 4 illustrated in FIG. 3 is a sensor which detects the speed of the vehicle C. The vehicle speed sensor 4 detects, for example, the vehicle speed (wheel speed) by detecting the rotation of the wheel W (FIG. 1). The vehicle speed sensor 4 is electrically connected to the determination unit 66, and outputs vehicle speed information to the determination unit 66.

<Collision Prediction/Detection Device 3>

The collision prediction/detection device 3 illustrated in FIG. 3 is a device which detects the pedestrian P and acquires image data for detecting, for example, the distance from the vehicle C to the pedestrian P, the speed of the pedestrian P, the difference between the speed of the vehicle C and the speed of the pedestrian P (relative speed), the collision situation of the pedestrian P, and the movement of the pedestrian P. The collision prediction/detection device 3 uses, for example, cameras 31 to 34 of an advanced driver assistance system (ADAS) and a radar device 24 (see FIG. 1) such as a millimeter wave radar or a laser radar.

Images of the pedestrian P are detected by the cameras 31, 32, 33, and 34 of the ADAS to obtain information as to whether the pedestrian P is large or small. The radar device 2 of the ADAS acquires information on the distance to the pedestrian P.

The collision prediction/detection device 3 (cameras 31 to 34 and radar device 24) is electrically connected to the control device 6.

As illustrated in FIG. 1, the radar device 24 is installed to, for example, the center of the front end edge of the vehicle C. The distance information acquired by the radar device 24 is sent to the control device 6 (see FIG. 3).

Hereinafter, description is provided for the cameras 31 to 34 of the collision prediction/detection device 3.

The cameras 31 to 34 illustrated in FIG. 1 are image capturing devices for acquiring image data on the space in front of the vehicle C. The image data on the space in front of the vehicle C is used to predict that the pedestrian P will collide with the vehicle C. The cameras 31 to 34 are an infrared camera, a CMOS camera, a CCD camera device, and the like for photographing the space in front of the vehicle C. The image data acquired by the cameras 31 to 34 is sent to the control device 6 (see FIG. 3). Note that it suffices there is only one camera with a single lens.

Note that the cameras 31 to 34 may be a plurality of cameras provided at multiple locations such as the rearview mirror 13, the hood grille 16, and the door mirrors 14, 15, or may be only one camera provided on the rearview mirror 13. Moreover, if the cameras 31 to 34 are infrared cameras, it is possible to project the space in front of the vehicle C clearly even at night when the surroundings are dark.

The camera 31 is installed to the front of the rearview mirror 13 so that image data can be acquired on the space in front of the vehicle C, above the hood 11, and in front of the windshield f.

The camera 32 is installed in the engine room behind the hood grill 16 so that image data on the space in front of the vehicle C can be acquired.

The cameras 33 and 34 are installed with their lenses exposed from the front surfaces of the left and right door mirrors 14 and 15 so that image data on the left and right spaces in front of the vehicle C can be acquired.

<Airbag Device 2>

The airbag device 2 illustrated in FIG. 1 is a device which deploys the front airbag 21 forward of the vehicle C in order to protect the pedestrian P in response to an operation signal from the determination unit 66 of the control device 6. The airbag device 2 includes an airbag module 22. The airbag module 22 includes the front airbag 21.

Figure 4A:
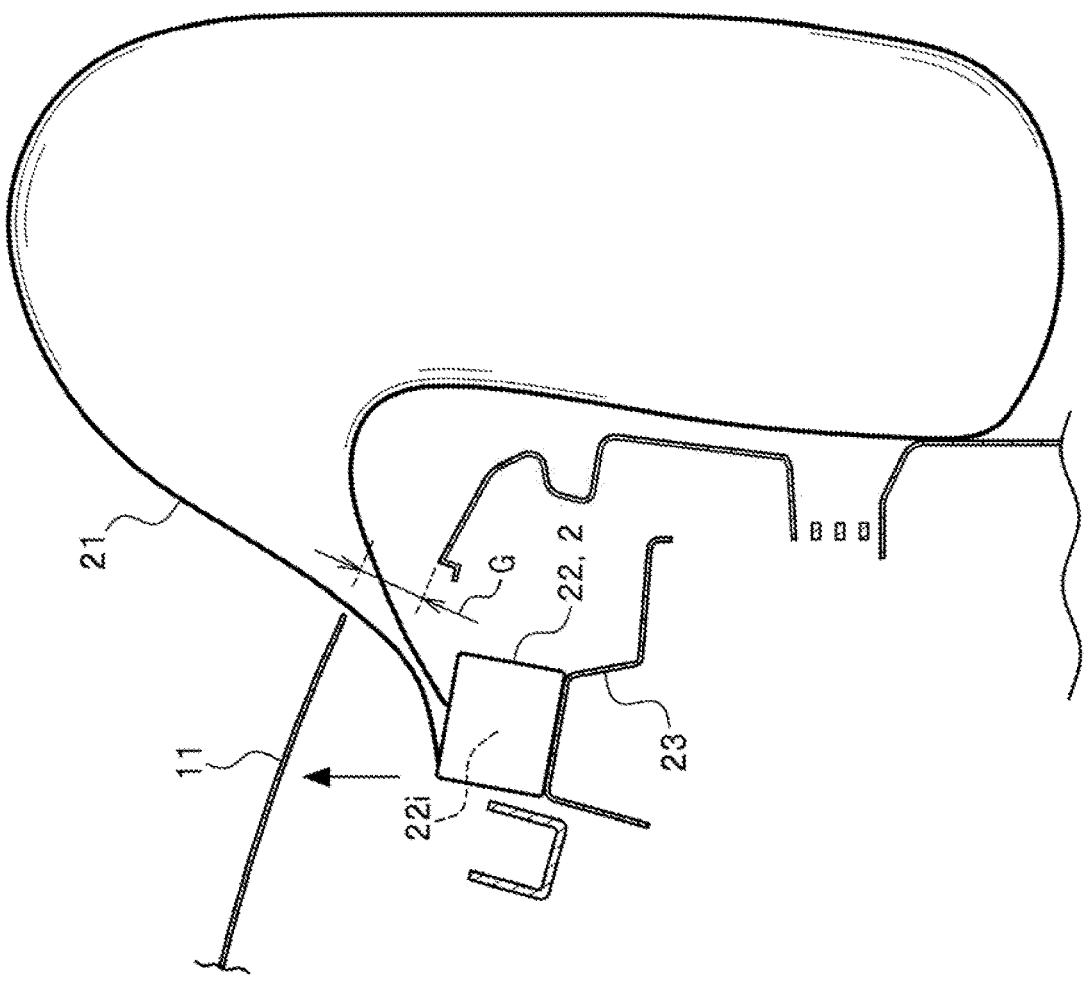
FIG. 4A is a side cross-sectional view of the vehicle near the airbag device at the time of non-operation.
Figure 4B:
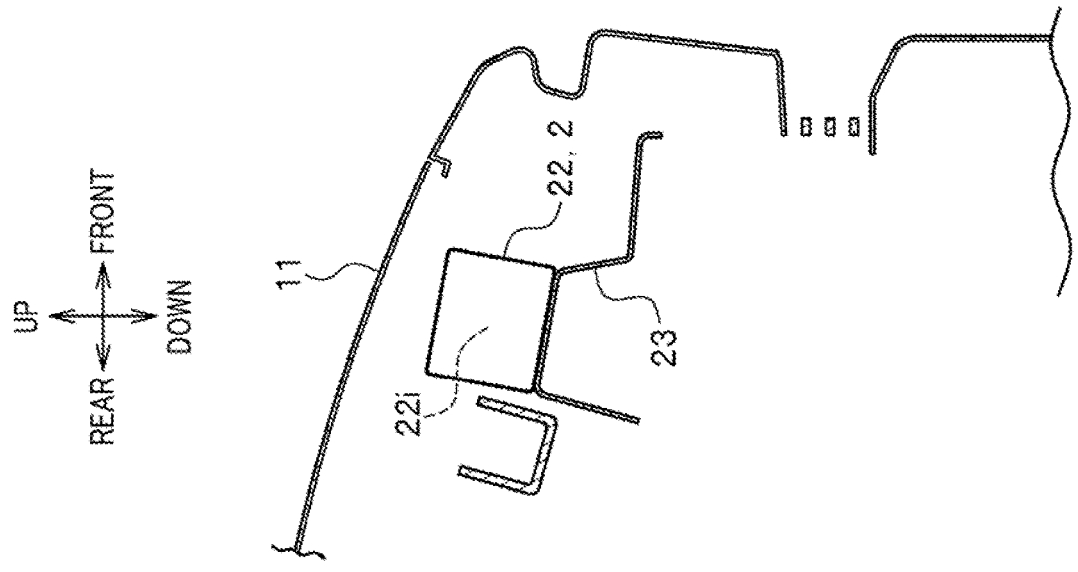
FIG. 4B is a side cross-sectional view of the vehicle near the airbag device at the time of operation.

FIG. 4A is a side cross-sectional view of the vehicle C near the airbag device 2 at the time of non-operation, and FIG. 4B is a side cross-sectional view of the vehicle C near the airbag device 2 at the time of operation.

The airbag module 22 is installed on a reinforcing member 23 around a radiator inside the vehicle C, and an inflator 22$i$ is installed inside the airbag module 22. As illustrated in FIG. 1, the airbag module 22 is formed long in the vehicle width direction in accordance with the shape of the front airbag 21 in order to allow the front airbag 21 to inflate smoothly and largely in the vehicle width direction.

A vent hole (illustration omitted) for air venting is formed in the front airbag 21 for the purpose of proper deflation after deployment.

The inflator 22$i$ includes, for example, a not-illustrated ignition device electrically connected to the determination unit 66 (see FIG. 3), a gas generating agent such as sodium azide, and a case body containing them.

The airbag device 2 starts to operate in response to an operation signal sent from the determination unit 66, the operation signal sent at the timing when the determination unit 66 (see FIG. 3) predicts or detects that the pedestrian P will collide with the vehicle C or at the timing when the speed difference detected by a speed difference specifying unit 65 is equal to or less than the threshold. In response to the operation signal, the ignition device of the inflator 22$i$ instantaneously burns the gas generating agent. This generates a high-pressure gas to instantly inflate the front airbag 21 as illustrated in FIG. 4B. Here, the pop-up devices 5 slightly open the hood 11 to form a gap G (FIG. 4B) through which the front airbag 21 bulges forward of the vehicle C. Note that the hood 11 may have a configuration which unlocks the hood 11 with an electromagnetic hood opener instead of the pop-up devices 5, thereby opening the hood 11 to form the gap G.

As illustrated in FIG. 4B, the operation of the airbag device 2 deploys the front airbag 21 forward of the vehicle C, and the presence of the inflated front airbag 21 between the vehicle C and the pedestrian P reduces the impact received by the pedestrian P.

<Pop-Up Devices 5>

The pop-up devices 5 illustrated in FIG. 3 are devices which, when the determination unit 66 predicts that the pedestrian P will collide with the vehicle C, raise the hood 11 to increase the movement stroke of the hood 11 as illustrated in FIG. 2B, and thereby enlarge the deformation space of the hood 11 to improve the capability of absorbing the impact on the pedestrian P.

The pop-up devices 5 include front pop-up devices 51 and rear pop-up devices 52, as illustrated in FIG. 2B. The front pop-up devices 51 are disposed on the front side of the hood 11 to raise the front side of the hood 11. The rear pop-up devices 52 are disposed on the rear side of the hood 11 to raise the rear side of the hood 11.

Figure 5A:
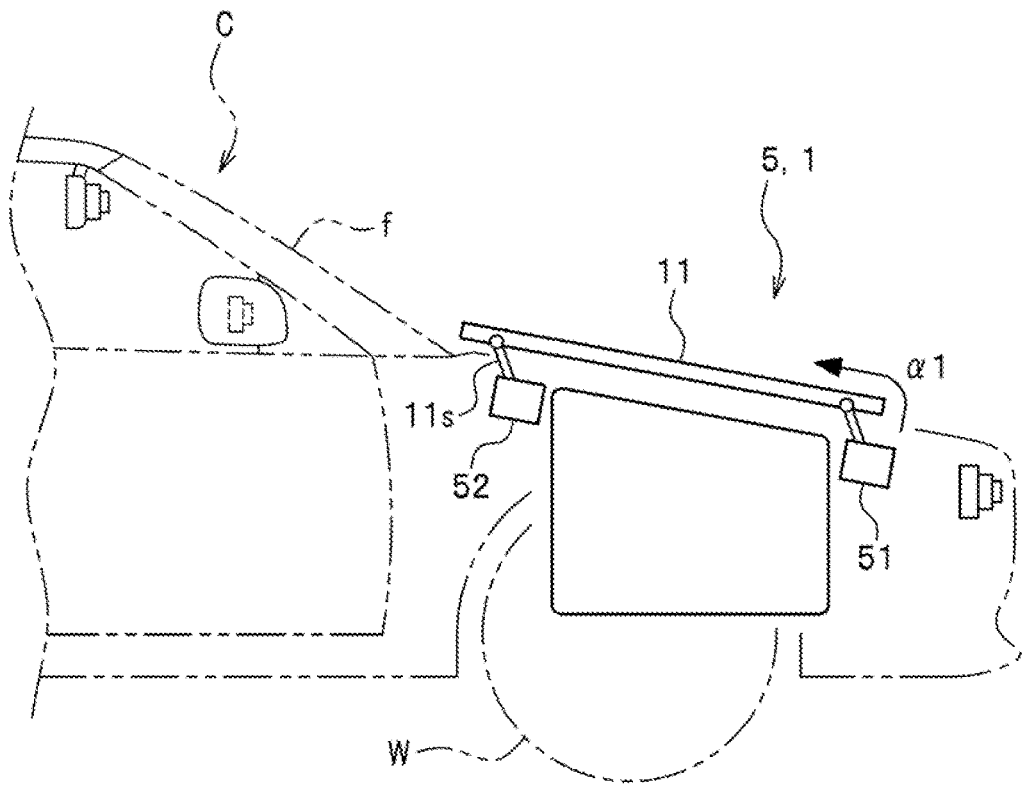
FIG. 5A is a schematic side cross-sectional view in which the hood is slid to the vicinity of the base of the rear windshield using the front and rear pop-up devices.
Figure 5B:
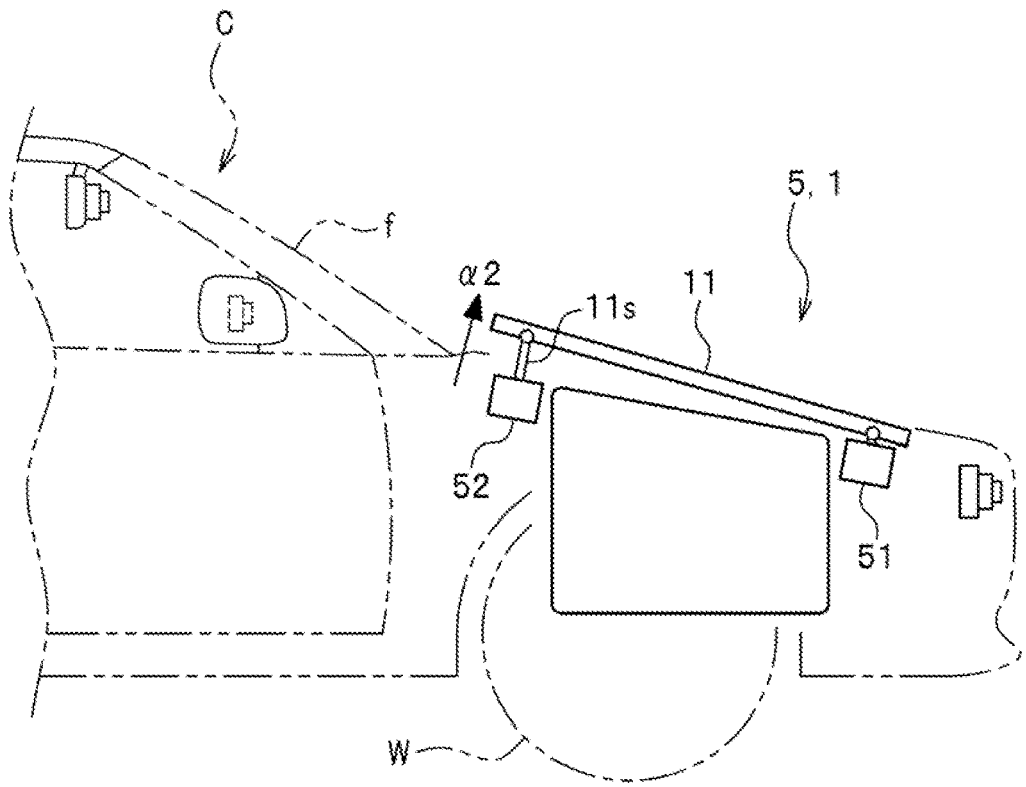
FIG. 5B is a schematic side cross-sectional view of raising the rear side of the hood instantaneously using the rear pop-up devices.

FIG. 5A is a schematic side cross-sectional view in which the hood 11 is slid to the vicinity of the base of the rear windshield f using the front and rear pop-up devices 51 and 52, and FIG. 5B is a schematic side cross-sectional view of raising the rear side of the hood 11 instantaneously using the rear pop-up devices 52.

When the determination unit 66 of the control device 6 determines that the pedestrian P will collide with the vehicle C, the front and rear pop-up devices 51 and 52 operate in response to an operation signal from the determination unit 66, and slide the entire hood 11 to the vicinity of the base of the rear windshield f (see arrow $\alpha 1$ in FIG. 5A) or instantaneously raise the rear side of the hood 11 (see arrow $\alpha 2$ in FIG. 5B).

The device for driving the pop-up devices 5 is not particularly limited, and is, for example, a motor or a gas generator such as a micro gas generator.

For example, in the case of a motor, the motor is used as well as a gear of a reduction mechanism, a first cam and a second cam or a first link and a second link of the front and rear pop-up devices 51 and 52 for controlling the movement trajectory of the hood 11, and the like. Then, the motor is switched to the first cam which slides the entire hood 11 to the vicinity of the base of the rear windshield f or to the second cam which raises the rear side of the hood 11, thereby sliding the hood 11 supported by support members 11$s$ to the vicinity of the base of the rear windshield f or raising the rear side of the hood 11.

Alternatively, the motor is switched to the first link which slides the entire hood 11 to the vicinity of the base of the rear windshield f or to the second link which raises the rear side of the hood 11, thereby sliding the hood 11 supported by support members 11$s$ to the vicinity of the base of the rear windshield f or raising the rear side of the hood 11. Note that the device for driving the pop-up devices 5 may be constituted by a combination of cams and links.

<Acceleration Sensor>

The acceleration sensors GS1, GS2, and GS3 illustrated in FIG. 1 are sensors which detect collision between the pedestrian P and the vehicle C. In this example, the acceleration sensors GS1, GS2, and GS3 are installed at three locations inside the front bumper 18, at left, right, and the center.

The acceleration sensors GS1, GS2, and GS3 detect collision with the pedestrian P in the entire area of the front bumper 18.

<Physical Sensor s9 Such as P Sensor>

The physical sensor s9 such as a P (pressure) sensor illustrated in FIG. 1 is a sensor which detects collision between the pedestrian P and the vehicle C.

In addition, the detection of collision with the pedestrian P may be performed by the collision prediction/detection device 3, or the detection of collision with the pedestrian P may be performed by the collision prediction/detection device 3 and the acceleration sensors GS1, GS2, and GS3 or/and physical sensor s9 such as a P sensor.

<Control Device 6>

As illustrated in FIG. 3, the control device 6 has a storage unit 60 and a processing unit 61, and includes, for example, a CPU, a ROM, a RAM, a microcomputer, and the like.

The storage unit 60 stores, in advance, image data captured by the cameras 31 to 34 and information necessary for determining the pedestrian P, the bicycle, or the like in the distance information acquired by the radar device 24. The information necessary for the determination of the pedestrian P or the bicycle is, for example, a pedestrian template characterized by the outline shape of the pedestrian P as the protection target, or a bicycle template. The storage unit 60 is electrically connected to a distance specifying unit 62 being the processing unit 61, a protection target specifying unit 63, a protection target state detection unit 64, the speed difference specifying unit 65, and the determination unit 66.

The processing unit 61 refers to and processes the image information acquired by the collision prediction/detection device 3 (cameras 31 to 34), the distance information acquired by the radar device 24, the acceleration information acquired by the acceleration sensors GS1, GS2, and GS3, the pressure information and the like acquired by the physical sensor s9, the vehicle speed information acquired by the vehicle speed sensor 4, and the reference data stored in the storage unit 60. The processing unit 61 includes the distance specifying unit 62, the protection target specifying unit 63, the protection target state detection unit 64, the speed difference specifying unit 65, and the determination unit 66.

The distance specifying unit 62 specifies the distance (relative position) between the vehicle C and the pedestrian P. The distance specifying unit 62 specifies the distance to the pedestrian P or the like with the radar device 24 such as a laser radar or a millimeter wave radar, for example. Note that the distance between the vehicle C and the pedestrian P or the like may be measured by analyzing parallax images captured simultaneously by two cameras. The distance specifying unit 62 is electrically connected to the protection target specifying unit 63.

The protection target specifying unit 63 has a function of specifying the pedestrian P, the bicycle, or the like in the objects included in the image captured by the collision prediction/detection device 3. For example, the protection target specifying unit 63 refers to the pedestrian template and thereby specifies an object, having an outline shape similar to the pedestrian template, as the pedestrian P. Alternatively, the protection target specifying unit 63 refers to the bicycle template and thereby specifies an object having an outline shape similar to the bicycle template as a bicycle.

The protection target specifying unit 63 is electrically connected to the determination unit 66.

The protection target state detection unit 64 specifies the state of the pedestrian or the like such as the moving direction or the moving speed of the pedestrian P or the like. The protection target state detection unit 64 specifies, for example, the moving direction and the moving speed of the pedestrian P or the like from the difference between the image data captured in time series. The protection target state detection unit 64 may specify not only the moving speed and the moving direction of the pedestrian P or the like before collision but also the moving speed and the moving direction of the pedestrian P or the like who has fallen onto the hood 11 after collision. The protection target state detection unit 64 is electrically connected to the determination unit 66.

The determination unit 66 determines whether the vehicle C and the pedestrian P will collide based on, for example, the information from the distance specifying unit 62 and the protection target state detection unit 64. For example, when it is determined that collision with the pedestrian P is inevitable even if the speed is reduced by the automatic braking function, the determination unit 66 predicts that collision with the pedestrian P will occur. In addition, when the distance to the pedestrian P becomes zero, the determination unit 66 determines that collision with the pedestrian P has occurred.

The determination unit 66 is electrically connected to the inflator 22i as well as the front and rear pop-up devices 51 and 52.

The speed difference specifying unit 65 specifies, for example, the speed difference (relative speed) between the vehicle C and the pedestrian P after collision with the pedestrian P. When the vehicle C collides with the pedestrian P, the vehicle C usually decelerates to reduce its speed, and the pedestrian P is pushed by the vehicle C to increase its speed. The speed difference specifying unit 65 is electrically connected to the determination unit 66.

For example, when the speed difference between the vehicle C and the pedestrian P becomes equal to or less than a threshold, the speed difference specifying unit 65 predicts a collision, and transmits a signal to the inflator 22i to deploy the airbag module 22.

<<Operation of Airbag Device 2 of Pedestrian Protecting Device 1 for Vehicle>>

Figure 6:
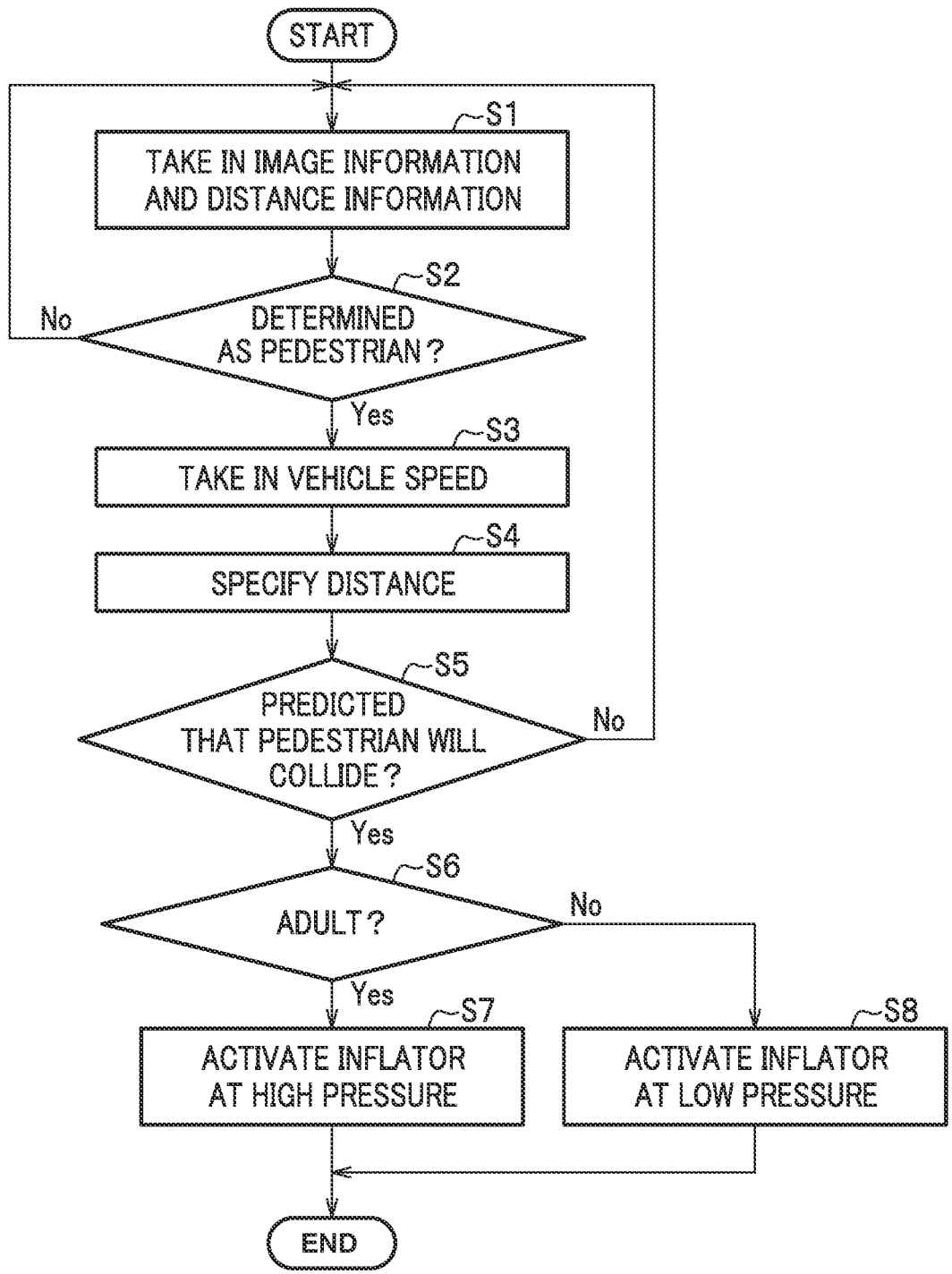
FIG. 6 is a flowchart illustrating the operation of the airbag device.

Next, description is provided for the operation of the airbag device 2 (FIG. 2A) of the pedestrian protecting device 1 for vehicle with reference to FIG. 6. FIG. 6 is a flowchart illustrating the operation of the airbag device 2.

The pedestrian P is described as an example of the protection target.

As illustrated in FIG. 1, the hood 11 and the hood edge cover 17 are lowered relative to the vehicle body at normal time. In addition, the front airbag 21 is folded and stored in the airbag module 22.

The driver turns on the ignition switch (illustration omitted) inside the vehicle C, which drives the collision prediction/detection device 3 including the cameras 31 to 34 and the radar device 24, the acceleration sensors GS1, GS2, and GS3, the physical sensor s9 such as a P (pressure) sensor, the vehicle speed sensor 4 (see FIG. 3), and the like. Thus, the pedestrian protecting device 1 for vehicle can monitor the pedestrian P, and the pedestrian protecting device 1 for vehicle starts.

First, image information on the space in front of the vehicle and distance information are taken in by the collision prediction/detection device 3 (step S1 in FIG. 6).

Next, the pedestrian specifying unit 63 (see FIG. 3) determines whether the image is that of the pedestrian P by comparing the image information from the collision prediction/detection device 3 with the pedestrian template in the storage unit 60 such as the height, volume, position of the center of gravity, or shape of the pedestrian P (step S2).

When it is determined that the image information on the target to be protected by the collision prediction/detection device 3 is that of the pedestrian P, the processing proceeds to step S3. When it is determined that the image information from the collision prediction/detection device 3 is not that of the pedestrian P, the processing returns to step S1.

Next, the vehicle speed sensor 4 takes in the vehicle speed signal (wheel speed signal). Specifically, the rotation of the wheels is detected to detect the vehicle speed of the vehicle C (step S3).

Next, the distance specifying unit 62 (see FIG. 3) specifies the distance between the vehicle C and the pedestrian P using the radar device 24 (step S4). Alternatively, parallax images captured simultaneously by two cameras (for example, the cameras 31 and 32) may be analyzed to specify the distance between the vehicle C and the pedestrian P.

Next, the determination unit 66 calculates the relative speed between the vehicle C and the pedestrian P based on the speed information in step S3, the information on the distance from the vehicle C to the pedestrian P in step S4, and the elapsed time. It is predicted whether the pedestrian P will collide with the vehicle C by referring to the relative speed and the distance information as well as the data in the storage unit 60 (step S5). Specifically, the collision between the vehicle C and the pedestrian P is predicted in cooperation with the ADAS. For example, the threshold of the relative speed between the vehicle C and the pedestrian P is lowered to predict collision.

When the determination unit 66 (see FIG. 3) determines that the pedestrian P will not collide with the vehicle C (No in step S5), the processing proceeds to step S1.

When the determination unit 66 (see FIG. 3) determines that the pedestrian P will collide with the vehicle C (Yes in step S5), the determination unit 66 determines in step S6 whether the pedestrian P is an adult or a child based on the height of the pedestrian P obtained from the image information and the distance information.

When the pedestrian P is determined to be an adult in step S6 (Yes in step S6), the determination unit 66 transmits an operation signal for adults to the inflator 22i, and causes the inflator 22i to operate the front airbag 21 at high pressure for adults, as illustrated in FIG. 7A. For example, two explosives are detonated to generate a gas, and a high pressure front airbag 21a is deployed (step S7). This deploys the high pressure front airbag 21 between the large-bodied adult pedestrian P1 and the vehicle C, as illustrated in FIG. 7A, making it possible to protect the adult pedestrian P1 by absorbing the impact on the adult pedestrian P1 with the large high-pressure front airbag 21. Note that FIG. 7A is a view illustrating the operation of the airbag device 2 for an adult pedestrian P1, and FIG. 7B is a view illustrating the operation of the airbag device 2 for a child pedestrian P2.

When the pedestrian P is determined not to be an adult but to be a child in step S6 (No in step S6), the determination unit 66 transmits an operation signal for children to the inflator 22i, and causes the inflator 22i to operate the front airbag 21 in a small range at low pressure for children, as illustrated in FIG. 7B (step S8). For example, one explosive is detonated to generate a gas, and a low pressure and small range front airbag 21b is deployed. This deploys the low pressure and small range front airbag 21 between the small-bodied child pedestrian P2 and the vehicle C, making it possible to protect the child pedestrian P2 by absorbing the impact on the child pedestrian P2.

Alternatively, when the pedestrian P2 is determined to be a child in step S6 (No in step S6), the airbag device 2 may be kept inactive in the case where the deployment of the front airbag 21 is presumed to be harmful to the pedestrian P2.

Note that although the flowchart of FIG. 6 presents the case of determining whether the pedestrian P is an adult or a child in step S6, the configuration may be such that determination is made as to whether the pedestrian P is an adult or a child in step S2.

Since the airbag device 2 of the pedestrian protecting device 1 for vehicle is configured to cooperate with the ADAS to deploy the front airbag 21 according to the physical size of the pedestrian P, it is possible to protect the pedestrian P with the airbag device 2 and to suppress the harmfulness of the front airbag 21. In addition, since the protection by the front airbag 21 according to the physical size of the pedestrian P is possible, the safety of the pedestrian P is further enhanced.

<<Operation of Pop-Up Devices 5 of Pedestrian Protecting Device 1 for Vehicle>>

Figure 8:
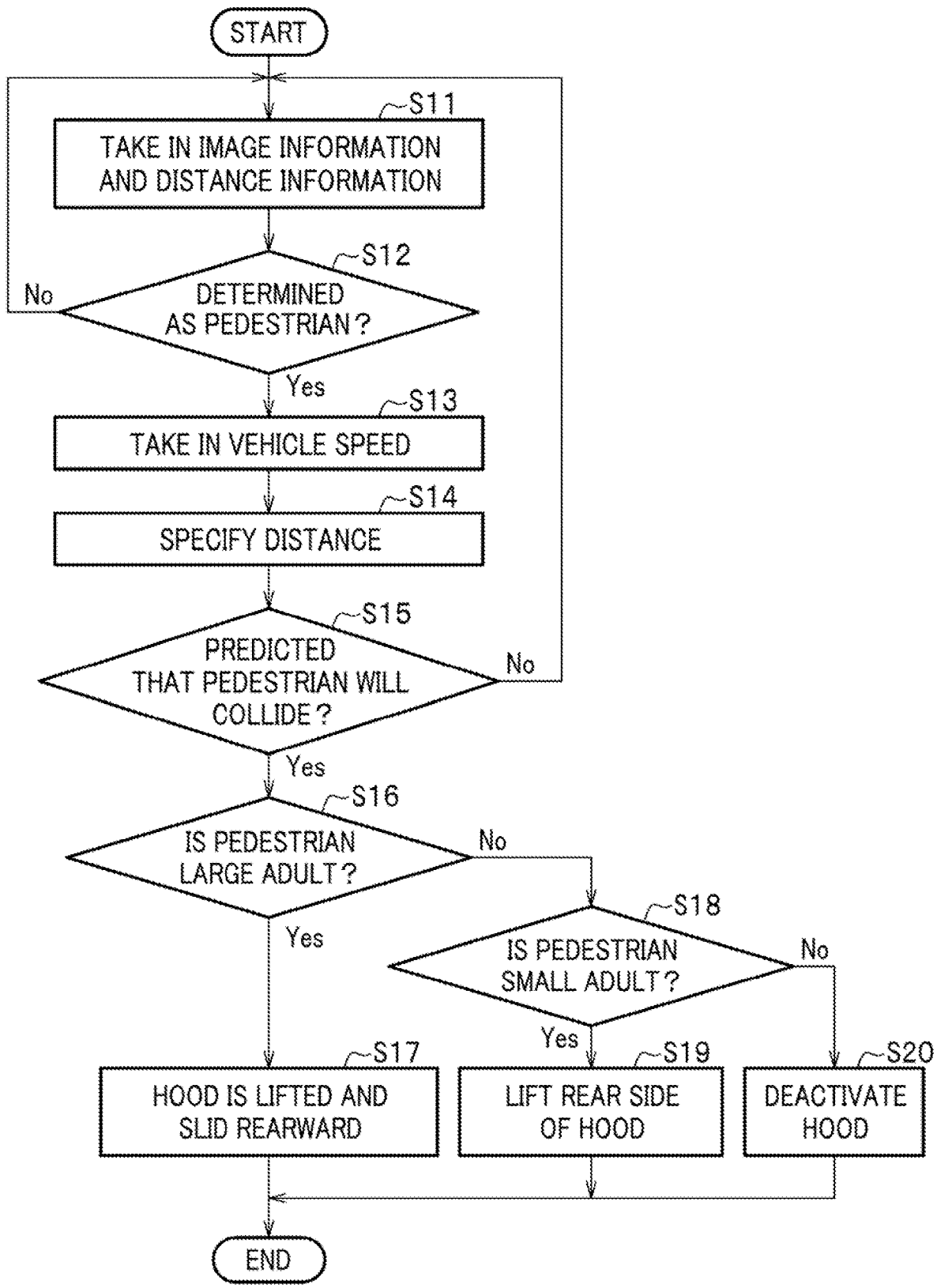
FIG. 8 is a flowchart illustrating the operation of the pop-up devices.

Next, description is provided for the operation of the pop-up devices 5 (FIGS. 5A and 5B) of the pedestrian protecting device 1 for vehicle with reference to FIG. 8. FIG. 8 is a flowchart illustrating the operation of the pop-up devices 5.

As illustrated in FIG. 1, the hood 11 and the hood edge cover 17 are lowered relative to the vehicle body at normal time.

The driver turns on the ignition switch (illustration omitted) inside the vehicle C, which drives the collision prediction/detection device 3 including the cameras 31 to 34 and the radar device 24, the acceleration sensors GS1, GS2, and GS3, the physical sensor s9 such as a P sensor, and the vehicle speed sensor 4 (see FIG. 3). Thus, the pedestrian protecting device 1 for vehicle can monitor the pedestrian P, and the pedestrian protecting device 1 for vehicle starts.

Since step S11 to step S15 of FIG. 8 are the same as step S1 to step S5 of FIG. 6, their description is omitted.

When the determination unit 66 (see FIG. 3) determines that the pedestrian P will collide with the vehicle C (Yes in step S15 in FIG. 8), the determination unit 66 determines in step S16 whether the pedestrian P is a large adult based on the height, volume, position of the center of gravity, and body shape of the pedestrian P as well as the distance to the pedestrian P obtained from the image information and the distance information.

When it is determined that the pedestrian P is a large adult (Yes in step S16), the motors of the front pop-up devices 51 and the rear pop-up devices 52 operate as illustrated in FIG. 9A to lift the hood 11 supported by the support members 11s and slide it to the vicinity of the base of the rear windshield f (arrow α1 in FIG. 9A). Specifically, when the pedestrian P3 is a large adult, the entire hood 11 is lifted and slid to the vicinity of the base of the rear windshield f (step S17). This makes it possible to place the head of the large adult pedestrian P3 on the hood 11 slid to the vicinity of the base of the rear windshield f and thereby to protect the head of the large adult pedestrian P3. In addition, the upper body of the large pedestrian P3 can be placed on the hood 11 for protection. Note that FIG. 9A is a view illustrating the operation of the pop-up devices 5 for a large adult pedestrian P3, and FIG. 9B is a view illustrating the operation of the pop-up devices 5 for a small adult pedestrian P4.

When it is determined that the pedestrian P is not a large adult (No in step S16), the determination unit 66 determines, in step S18, whether the pedestrian P is a small adult based on the height, volume, position of the center of gravity, and body shape of the pedestrian P as well as the distance to the pedestrian P obtained from the image information and the distance information.

When it is determined that the pedestrian P is a small adult (Yes in step S18), the motors of the rear pop-up devices 52 operate as illustrated in FIG. 9B to lift the rear side of the hood 11 supported by the support members 11s (arrow α2 in FIG. 9B) (step S19). Thus, when the pedestrian P4 is a small adult, it is possible to place the head of the small pedestrian P4 on the rear side of the hood 11 thereby to protect the head of the small pedestrian P4.

Figure 10:
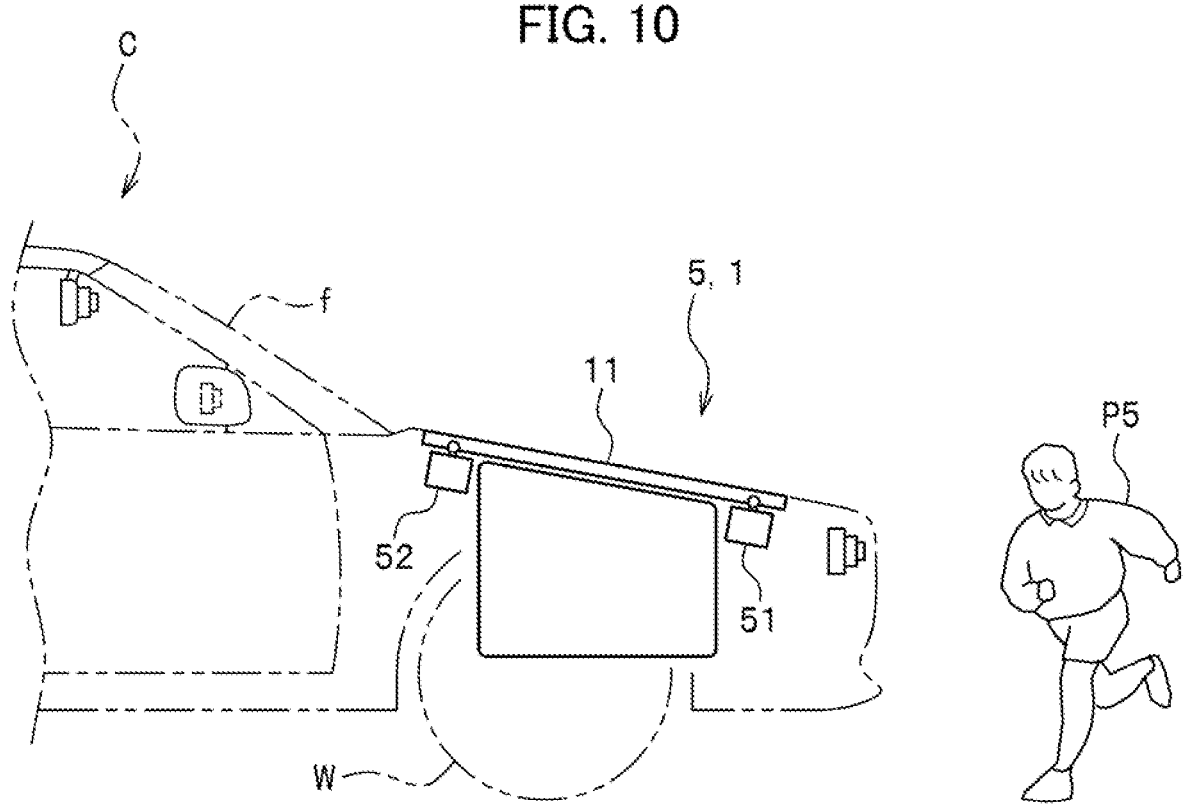
FIG. 10 is a view illustrating the operation of the pop-up devices for a child pedestrian.

When it is determined that the pedestrian P is not a small adult (No in step S18 in FIG. 8), the pedestrian P5 has a physical size close to that of a child, and the lifting of the hood 11 has no effect. Therefore, as illustrated in FIG. 10, the front pop-up devices 51 and the rear pop-up devices 52 are kept inactive (step S20). FIG. 10 illustrates the operation of the pop-up devices 5 for a child pedestrian P5.

The configuration of the pop-up devices 5 of the above-described pedestrian protecting device 1 for vehicle makes it possible to adjust the movement amount of the hood 11 with the front pop-up devices 51 and the rear pop-up devices 52 of the actuator.

In addition, based on the height and the head position of the pedestrian P, it is possible to determine how to lift the hood 11 and whether to lift it.

Moreover, since the behavior of the hood 11 is controlled in cooperation with the ADAS according to the physical size of the pedestrian P, it is possible to protect the pedestrian P or the like with the hood 11 according to the physical size of the pedestrian P.

As described above, since the collision between the pedestrian P and the vehicle C is predicted in advance in cooperation with the ADAS, the pop-up devices 5 can be driven with the motor.

Therefore, it is possible to achieve the pedestrian protecting device 1 for vehicle capable of protection depending on the protection target when the protection target such as the pedestrian P collides with the vehicle C, and the vehicle C provided with the same.

OTHER EMBODIMENTS

1. Although the pedestrian protecting device 1 for vehicle of the above-described embodiment protects the pedestrian P and the bicycle, other devices may be protected.
2. Although the above-described embodiment exemplifies a case where the collision prediction/detection device 3 including the cameras 31 to 34 and the radar device 24 predicts the collision between the pedestrian P and the vehicle C, the collision may be detected with the acceleration sensors GS1, GS2, and GS3 and the physical sensor s9 such as a P sensor.

Then, the configuration may be such that the pop-up devices 5 are each a gas generator using an explosive, and after the collision, the hood 11 is lifted according to the physical size of the pedestrian P as illustrated in FIGS. 9A and 9B. Thereby, the configuration of the pop-up devices 5 can be diversified.

3. In the pop-up devices 5 of the above-described embodiment, the front and rear pop-up devices 51 and 52 are actuators using a motor. However, the front pop-up devices 51 may each be a gas generator using an explosive because they hit first, and the rear pop-up devices 52 may each be an actuator using a motor because they hit later. Note that the front and rear pop-up devices 51 and 52 may have a configuration other than the configuration described.

This allows the configuration of the pop-up devices 5 to have a degree of freedom.

4. Although the airbag device 2 and the pop-up devices 5 have been described independently in the above-described embodiment, they may be operated simultaneously.
5. In the above-described embodiment, description is provided for a configuration which lifts the hood 11 to deploy the front airbag 21. However, it is possible to employ a configuration in which a hole for deployment is provided in advance, in which a hole for deployment is provided and covered with a low strength cover, and the front airbag 21 is deployed through the hole without raising the hood 11, or in which the cover is opened and the front airbag 21 is deployed through the hole.
6. The configurations described in the aforementioned embodiments are examples, and various configurations and modifications are possible within the scope of claims.

What is claimed is:

1. A pedestrian protecting device for a vehicle, comprising:
   a protection device which protects a protection target upon colliding with a vehicle;
   a measurement device which measures an image of the protection target and a distance from the vehicle to the protection target; and
   a control device which operates the protection device in a different manner depending on a size of the protection target,
   wherein
   the protection device includes a pop-up device which moves a hood on an upper front of the vehicle,
   the protection device includes an airbag device,
   the airbag device includes an airbag which is deployed forward of the vehicle, and
   the control device determines whether the protection target is large or small based on information from the measurement device, and,
     if the protection target is large, causes the airbag device to deploy the airbag, and,
     if the protection target is small, causes the airbag device to deploy the airbag at lower pressure in a smaller range than in a case where the protection target is large, or keeps the airbag device inactive.

2. A pedestrian protecting device for a vehicle, comprising:
   a protection device which protects a protection target upon colliding with a vehicle;
   a measurement device which measures an image of the protection target and a distance from the vehicle to the protection target; and
   a control device which operates the protection device in a different manner depending on a size of the protection target,
   wherein
   the protection device includes a pop-up device which moves a hood on an upper front of the vehicle,
   the control device determines whether the protection target is large, medium, or small based on information from the measurement device, and,
     if the protection target is large, causes the pop-up device to raise the hood and simultaneously move the hood rearward,
     if the protection target is medium, causes the pop-up device to raise a rear side of the hood, and,
     if the protection target is small, keeps the pop-up device inactive.

3. The pedestrian protecting device according to claim 2, wherein
   the pop-up device uses a motor as a drive source, and
   the control device predicts a collision between the protection target and the vehicle based on the information from the measurement device.

4. The pedestrian protecting device according to claim 2, wherein
   the pop-up device includes a pop-up device which is operated by a gas generator using an explosive and installed on a front side, and a pop-up device which uses a motor as a drive source and installed on a rear side.

5. The pedestrian protecting device according to claim 1, further comprising
   an acceleration sensor or a physical sensor which is provided in a front part of the vehicle and detects the collision, wherein the pop-up device is operated by a gas generator using an explosive, and the control device detects the collision based on information from the acceleration sensor or the physical sensor, and operates the pop-up device.

6. A vehicle comprising the pedestrian protecting device for the vehicle according to claim 1.

7. A vehicle comprising the pedestrian protecting device for the vehicle according to claim 2.

8. A vehicle comprising the pedestrian protecting device for the vehicle according to claim 3.

9. A vehicle comprising the pedestrian protecting device for the vehicle according to claim 4.

10. A vehicle comprising the pedestrian protecting device for the vehicle according to claim 5.

* * * * *